United States Patent [19]

Kloster

[11] 4,339,836

[45] Jul. 20, 1982

[54] LEAD SCREW THREADING ASSEMBLY

[76] Inventor: Kenneth D. Kloster, 6649 Millridge, Maumee, Ohio 43537

[21] Appl. No.: 266,885

[22] Filed: May 26, 1981

Related U.S. Application Data

[63] Continuation-in-part of Ser. No. 86,787, Oct. 22, 1979, abandoned.

[51] Int. Cl.³ ............................ B23G 1/26; B23G 5/04
[52] U.S. Cl. .................................. 10/123 P; 10/89 F;
 144/205; 408/127
[58] Field of Search .................. 144/205; 10/1 B, 111,
 10/123 R, 123 P, 123 S, 89 F; 408/215, 216,
 217, 218, 219, 220, 221, 238, 239, 79, 80, 127,
 186, 189, 190

[56] References Cited

U.S. PATENT DOCUMENTS

| 1,886,942 | 11/1932 | Czembo | 10/89 F X |
|---|---|---|---|
| 2,269,756 | 1/1942 | Cowie | 10/123 P X |
| 2,280,013 | 4/1942 | Stultz | 10/123 R X |
| 2,767,564 | 10/1956 | Green | 10/89 F X |
| 2,783,485 | 3/1957 | Noland et al. | 10/123 R |
| 3,875,832 | 4/1975 | Mayfield | 144/205 X |
| 3,999,452 | 12/1976 | Larsen | 144/205 X |
| 4,014,622 | 3/1977 | Lotz | 408/127 |
| 4,114,484 | 9/1978 | Feamster | 144/205 X |
| 4,269,421 | 5/1981 | Wawrzyniak | 408/127 X |

FOREIGN PATENT DOCUMENTS

| 329342 | 5/1940 | United Kingdom | 10/89 F |
|---|---|---|---|
| 542522 | 1/1942 | United Kingdom | 10/123 P |

Primary Examiner—Paul A. Bell
Attorney, Agent, or Firm—Wilson, Fraser, Barker & Clemens

[57] ABSTRACT

The present invention relates to a lead screw threading tool utilized to form external threads on the upper end of a cylindrical shroud of a shock absorber assembly of a vehicular suspension system. The tool includes an expandable collet which is inserted into one end of the shroud for maintaining a lead screw arbor in axial alignment with the interior opening of the shroud. The lead screw arbor is utilized for mounting a driver unit for longitudinal movement along the axis of the arbor. A thread forming die is fastened to the driver unit in such a manner so as to permit limited radial movement of the forming die relative to the axis of the arbor. The limited radial movement of the threading die permits the die to properly seat on the outer wall of the shroud in the event there is a variation in concentricity between the inner and outer walls of the cylindrical shroud.

1 Claim, 7 Drawing Figures

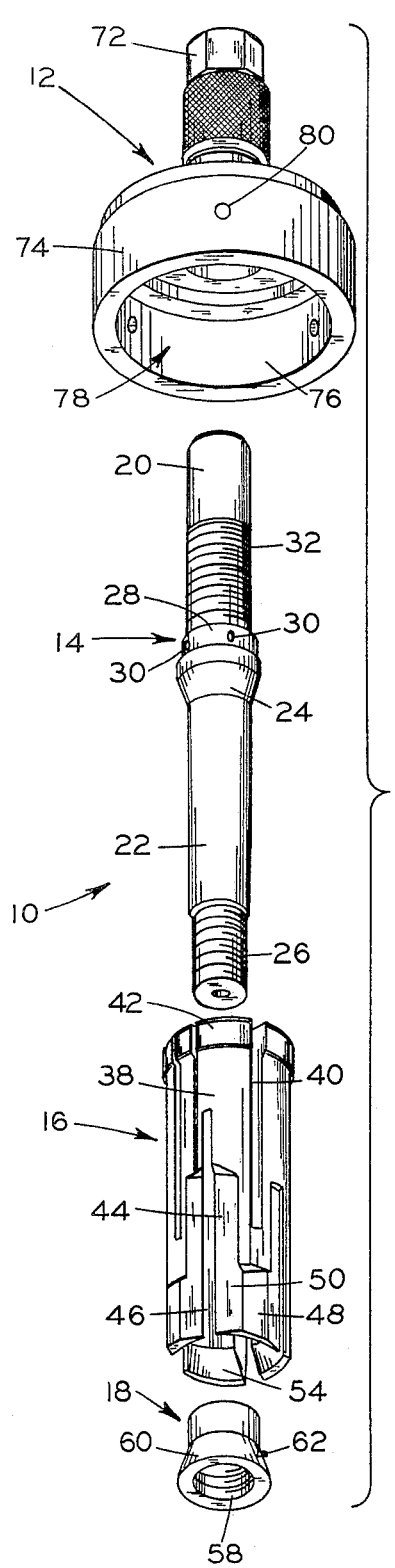
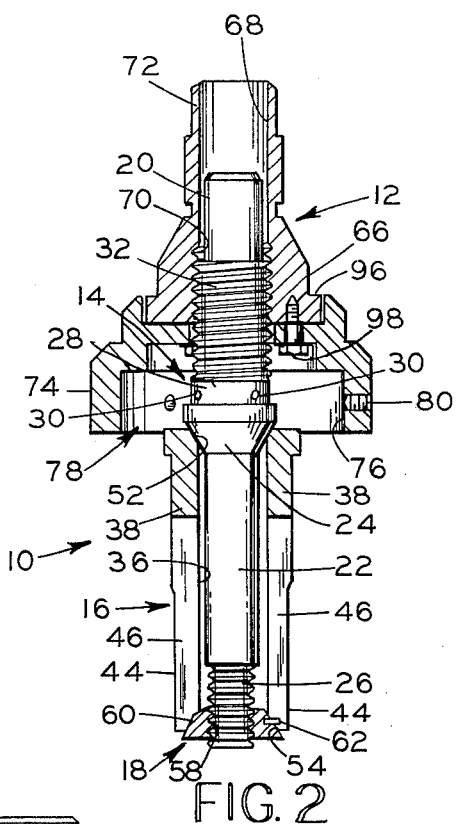
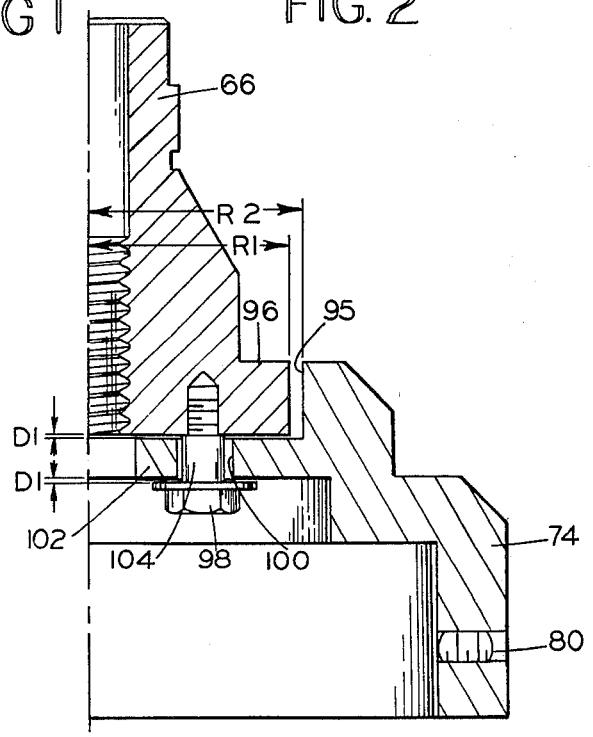
FIG 1
FIG. 2
FIG. 3

LEAD SCREW THREADING ASSEMBLY

CROSS-REFERENCE TO RELATED APPLICATION

This application is a continuation-in-part of my pending application, Ser. No. 086,787, filed Oct. 22, 1979 now abandoned.

BACKGROUND OF THE INVENTION

One type of vehicle suspension system which is becoming increasingly popular is the MacPherson strut suspension system. The MacPherson strut system includes an integral coil spring-shock absorber assembly to provide a lightweight, compact vehicle suspension system. The MacPherson strut suspension system is disclosed in more detail in U.S. Pat. No. 2,624,592 to E. S. MacPherson.

One of the problems associated with MacPherson strut assemblies is that the shock absorber typically wears out before the associated coil spring. One solution to this problem is to manufacture the MacPherson strut assembly with a construction which permits the shock absorber to be readily removed and replaced with a new shock absorber. However, this type of construction results in additional manufacturing expense. Consequently, some manufacturers produce MacPherson strut assemblies which do not readily accept replacement shock absorbers. In this type of assembly, the original equipment shock absorber is inserted into an associated cylindrical shroud which is subsequently sealed by welding or roll forming operations. The cylindrical shroud typically includes a coil spring support and a lower support bracket. Thus, when the shock absorber wears out, the vehicle owner is faced with the expense of replacing the entire cylindrical shroud assembly, including the coil spring support and the lower support bracket.

SUMMARY OF THE INVENTION

The present invention relates to a lead screw threading tool utilized to form threads on the outer wall of the cylindrical shroud of a MacPherson strut suspension system. In such systems wherein the original shock absorber is permanently sealed within the associated cylindrical shroud, the upper end of the shroud must first be severed to provide access to the original shock absorber. After the upper end of the shroud is severed, the worn shock absorber can be removed. At this time, the lead screw threading tool is utilized to form external threads on the upper end of the cylindrical shroud. A replacement shock absorber may then be inserted into the shroud and an internally threaded retaining nut may be connected to the top of the newly threaded shroud to effect the desired sealing of the system.

One of the problems encountered in forming threads on a cylindrical shroud of a vehicular suspension system is due to the construction of the shroud. Typically, the cylindrical shrouds utilized in vehicular suspension systems are not fabricated with the highest quality tubing. For example, there is often a substantial variation in the concentricity between the inner and outer walls of the shroud. Consequently, if a threading die is maintained in axial alignment with the interior of the shroud, the external threads may not be properly formed.

The lead screw threading tool of the present invention comprises guide means for insertion into the interior of the cylindrical shroud. The guide means includes outwardly adjustable arm means which are moved into engagement with the interior of the shroud to maintain the guide means in axial alignment with the interior of the shroud. A driver means is mounted on the guide means for longitudinal movement along the axis of the guide means. A thread forming die is mounted on the driver for limited radial movement relative to the axis of the guide means. The limited radial movement of the threading die permits the die to properly seat on the outer wall of the shroud in the event there is a variation in concentricity between the inner and outer walls of the cylindrical shroud.

Accordingly, it is an object of the present invention to produce a device which permits a sealed cylindrical shroud of a MacPherson strut assembly to receive and retain a replacement shock absorber.

It is another object of the present invention to produce a tool for forming threads in the outer wall of a cylindrical shroud of a MacPherson strut suspension system.

Another object of the invention is to produce a tool for forming threads on the outer wall of a cylindrical shroud which may readily and economically be manufactured and operated by servicing personnel without the need of considerable special training.

BRIEF DESCRIPTION OF THE DRAWINGS

The above, as well as other objects and advantages of the invention will become readily apparent to one skilled in the art from reading the following detailed description of a preferred embodiment of the invention when considered in light of the accompanying drawings in which:

FIG. 1 is an exploded perspective view of a lead screw threading tool embodying the features of the present invention;

FIG. 2 is an elevational view of the tool illustrated in FIG. 1, partly in section, in assembled condition;

FIG. 3 is an enlarged, quarter cross-sectional view of the driver unit of FIGS. 1 and 2;

DESCRIPTION OF THE PREFERRED EMBODIMENT

Figure 4:
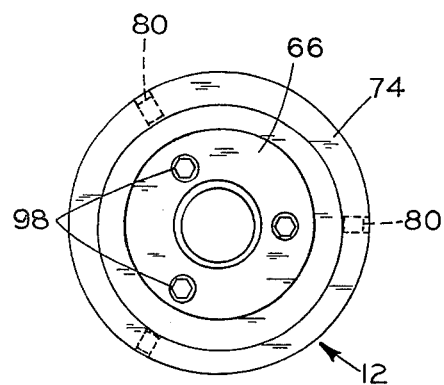
FIG. 4 is a bottom plan view of the driver unit of FIGS. 1 and 2.

Referring to FIGS. 1 and 2, there is shown a lead screw threading tool 10 embodying the features of the present invention. The threading tool 10 is utilized to form threads on the outer wall of a cylindrical shroud of a MacPherson strut suspension system.

The lead screw threading tool 10 includes four main components: a driver 12, a lead screw arbor 14, an expandable collet 16, and an externally tapered nut 18, as clearly illustrated in FIG. 1.

The lead screw arbor 14 includes elongate upper and lower shafts 20 and 22, respectively, which are connected by an intermediate tapered portion 24. The lower shaft 22 has an external threaded portion 26 formed on the lower end thereof. The upper end of the lower shaft 22 terminates in the intermediate tapered portion 24 having a tapered surface which extends upwardly and outwardly of the lower shaft 22.

The lower end of the upper shaft 20 has an annular shoulder portion 28 formed thereon adjacent the upper end of the tapered portion 24. A pair of bore holes 30 are formed to extend, at right angles to one another, through the shaft 20 in the region of the annular shoulder portion 28. As will be explained in more detail hereinafter, the bore holes 30 are formed to receive a suitable activating rod to effect a tightening procedure in the operation of the tool.

The upper shaft 20 has external lead screw threads 32 which are utilized to control the thread forming operation on the associated MacPherson strut cylinder. As will be discussed, the pitch of the threads 32 is substantially equal to the pitch of the cutting threads of a thread forming die disposed within the driver 12.

The lower shaft 22 of the arbor 14 is adapted to be received in a centrally disposed aperture 36 in the expandable collet 16. The collet 16 includes a plurality of upwardly extending arms 38 having a generally arcuate cross-section and are separated from one another by a plurality of longitudinally extending spaced apart vertical slots 40 terminating in the region of an annular rim 42. The annular rim 42 is formed on the upper end of each of the upper arms 38. As will be discussed, the rim 42 is utilized to support the collet on a shoulder portion typically formed in an associated MacPherson strut cylindrical shroud.

The collet 16 also includes a plurality of downwardly extending arms 44 separated from one another by a plurality of longitudinally extending spaced apart vertical slots 46. The arms 44 each have an outer arcuate surface 48 formed on the outermost terminal end thereof. The annular array of arcuate surfaces 48 cooperate to engage the inner wall of an associated MacPherson strut cylindrical shroud, as will be discussed hereinafter. The outer walls of the lower arms 44 also include longitudinally extending flat portions 50 formed adjacent the arcuate surfaces 48. The flat portions 50 cooperate to facilitate the insertion of the collet 16 into the cylindrical shroud.

Figure 6:
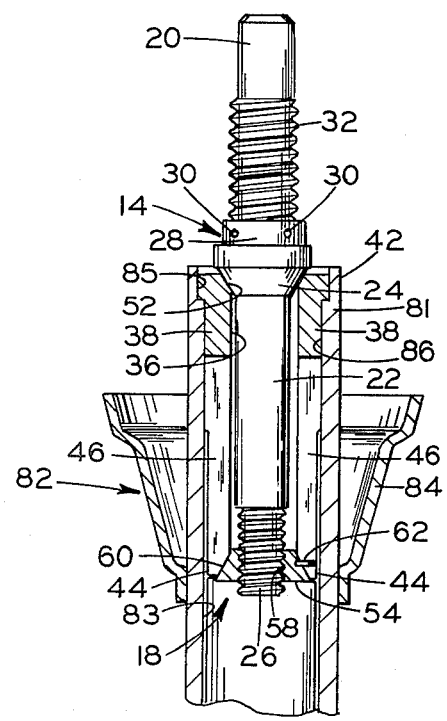
FIG. 6 is an elevational view of a portion of the tool illustrated in FIGS. 1 and 2 with portions in section showing the tool secured within a cylindrical shroud of an associated MacPherson strut suspension system.

The inner axial terminus of each of the upper arms 38 is formed to include an outwardly tapered surface 52 formed on the inner side thereof, as clearly illustrated in FIGS. 2 and 6. Similarly, the inner axial terminus of each of the lower arms 44 includes an outwardly tapered surface 54. The upper tapered surfaces 52 cooperate with the intermediate tapered portion 24 of the arbor 14 to expand the upper end of the collet 16, while the lower tapered surfaces 54 cooperate with the tapered nut 18 to expand the lower end of the collet 16.

The tapered nut 18 is formed with internal threads 58 on the inner wall thereof which are adapted to threadedly engage the lower threaded portion 26 of the arbor 14. The lower end of the nut 18 has a tapered portion 60 formed on the outer wall thereof for engagement with the lower tapered surfaces 54 of the collet 16. A stop pin 62 extends radially outwardly from the tapered portion 60 and is adapted to be received within one of the vertical slots 46 to militate against any rotative movement of the nut 18 with respect to the collet 16.

The driver 12 includes a main body portion 66 having an axially extending inner annular wall 68, as shown in FIG. 2, adapted to receive the upper shaft 20 of the arbor 14. The annular wall 68 has internal threads 70 formed therein for engagement with the lead screw threads 32 on the arbor 14. The driver 12 includes an upper end 72 having a generally hexagonal cross-section construction to permit the driver 12 to be rotated with a conventional tool, such as a wrench or socket, for example.

Figure 7:
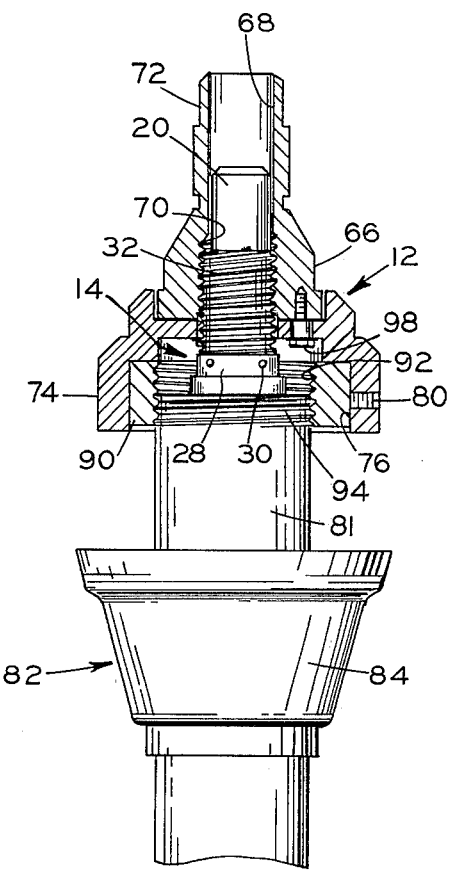
FIG. 7 is an elevational view, partly in section, of the tool illustrated in FIGS. 1 and 2 in operative position to form threads on the outer wall of a cylindrical shroud of a MacPherson strut assembly.

The lower end of the driver 12 includes an enlarged flanged end 74 having an inner annular wall 76 defining an aperture 78 for receiving a conventional thread forming die 90, as illustrated in FIG. 7. A plurality of circumferentially-spaced set screws 80 are threadedly received by internally threaded bore holes formed in the side wall of the flanged end 74. The set screws 80 are utilized to securely mount the thread forming die 90 within the aperture 78.

The present invention includes means for mounting the thread forming die 90 for limited radial movement relative to the longitudinal axis of the main body 66 and the lead screw arbor 14. Such means are clearly shown in FIG. 3, which illustrates the manner in which the flanged end 74 is fastened to the main body portion 66 of the driver 12. The flanged end 74 has an annular recess 95 formed in the upper end thereof for receiving a lower cylindrical end portion 96 of the main body 66. As shown in FIG. 3, the cylindrical end portion 96 is formed with a radius R1, while the annular recess 95 is formed with a radius R2.

The flanged end 74 is fastened to the main body portion 66 by a plurality of circumferentially-spaced shoulder screws 98 which extend through oversize bore holes 100 in the top wall 102 of the flanged end 74 and into internally threaded bore holes in the bottom of the main body portion 66. The spacing of the set screws 80 and the shoulder screws 98 are clearly shown in the bottom plan view of the driver in FIG. 4. Each shoulder screw 98 has an intermediate cylindrical spacer portion 104 having an axial length greater than the thickness of the top wall 102 by an amount represented in FIG. 3 as twice the dimension D1. The oversize bore holes 100 are formed with a radius greater than the radius of the spacer portion 104 by an amount at least equal to the difference between the radius R2 and the radius R1.

Mounting the flanged end 74 to the main body 66 in the above-described manner enables the threading die 90, which is rigidly secured to the flanged end 74, to move radially relative to the axis of the main body. The amount of radial movement is limited to the difference between the radius R2 and R1. As will be discussed, the limited radial movement of the threading die 90 permits the die to properly seat on the outer wall of the cylindrical shroud during the thread forming operation.

Figure 5:
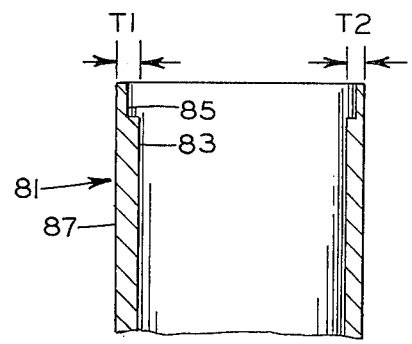
FIG. 5 is a sectional view of one end of a prior art cylindrical shroud on which the tool of the present invention can operate.

There is shown in FIG. 5 a sectional view of a prior art cylindrical shroud 81 which is typically utilized as one component of a MacPherson strut suspension assembly. The shroud 81 includes an inner wall 83 having an annular shoulder 85 formed at the upper end thereof. The outer wall of the shroud is indicated by reference numeral 87.

One of the problems associated with forming threads on a cylindrical shroud of the type shown in FIG. 5 is encountered when there is a variation in the concentricity between the inner wall 81 and the outer wall 87. For example, in FIG. 5, the thickness between the outer and the inner walls along the left side of the figure is represented by an amount T1, while the thickness along the right side is represented by an amount T2. In some cases, the amounts of T1 and T2 may differ as much as 0.020 of an inch. In these instances, if a threading die is maintained in axial alignment with the interior opening of the shroud, the external threads will not be properly formed. The present invention provides a means for mounting the threading die for limited radial movement to permit the threading die to properly seat on the outer wall of the shroud.

FIGS. 6 and 7 illustrate the operation of the lead screw threading tool 10 as it is utilized to form threads on the outer wall of a shroud 81 in a MacPherson strut assembly 82. The MacPherson strut 82 shown in FIGS. 6 and 7 has been partially disassembled by removing an associated coil spring (not shown) one end portion of which is typically supported by a coil spring support 84 welded to the cylinder 81. A tool which can be utilized to remove the coil spring is disclosed in U.S. Pat. No. 4,034,960 to K. D. Kloster.

Before the collet 16, lead screw arboer 14, and tapered nut 18 can be inserted into the shroud as shown in FIG. 6, the original worn shock absorber must be removed therefrom. In instances where the original shock absorber has been sealed within the shroud by welding or roll forming the upper end thereof, the upper end of the shroud must be severed to provide access to the original shock absorber. A tool which can be utilized to sever the upper end of the shroud is disclosed in U.S. patent application Ser. No. 086,784 filed Oct. 22, 1979.

After the upper end of the shroud is severed, the worn shock absorber can be removed. At this time, the lower shaft 22 of the lead screw arbor 14 is inserted into the central aperture 36 of the collet 16 and is loosely threaded into the tapered nut 18. When the tapered nut 18 and arbor 14 are loosely threaded, the outer diameter of the collet 14 is slightly less than the inner diameter of the shroud 81. This permits the assembly to be easily inserted into the shroud 81, as shown in FIG. 6, such that the upper annular rim 42 of the collet 16 engages the shoulder 85 at the top of the shroud 81.

In some instances, a vertical weld seam may be present on the inner wall 83 of the cylinder 81. Under these conditions, the flat portions 50 will accommodate the seam and thereby assist the operator in inserting the collet 16 into the shroud 81.

After the collet 16 has been inserted into the shroud 81, a suitable tool such as an elongate cylindrical rod is inserted into one of the bore holes 30 and is utilized to rotate the arbor 14 within the collet 16. As the arbor 14 is rotated, it is further threaded into the tapered nut 18 which is prevented from rotating by the stop pin 62. The intermediate tapered portion 24 of the arbor 14 is then caused to further engage the upper tapered surface 52 of the collet 16 and tends to cam the upper arms 38 outwardly to securely engage the same against the inner wall 83 of the associated shroud 81. Concurrently, the tapered portion 60 of the nut 18 further engages the lower tapered surface 54 of the collet 16 and cams the lower arms 44 outwardly to securely engage the inner wall 83 of the shroud 81. At this time, the lead screw arbor 14 is securely supported in axial alignment with the interior opening of the shroud 81.

Before the driver 12 is rotated onto the arbor 14, a conventional thread forming die 90 having internal cutting threads 92 formed therein is positioned within the aperture 78 as shown in FIG. 7. The forming die 90 is of a size suitable for forming threads in the outer wall of the shroud 81. The set screws 80 are tightened to secure the die 90 within the driver 12. The driver 12 is then rotated onto the lead screw arbor 14 to engage lead screw threads 32 with the internal threads 70. As the driver 12 is further rotated onto the arbor 14, the cutting threads 92 are moved into engagement with the outer wall of the shroud 81 to form external threads 94. As previously mentioned, the pitch of the lead screw threads 32 and the cutting threads 92 are substantially equal to ensure that the threads 94 are properly formed as the driver 12 is rotated. At this time, if there is any misalignment between the threading die 90 and the outer wall of the shroud 81, the threading die 90 and the flanged end 74 can move radially relative to the longitudinal axis of the lead screw arbor 14 to center the die 90 about the outer wall of the shroud.

After the threads 94 have been completely formed, the driver 12 is removed from the arbor 14 and the arbor is rotated to retract the expanded collet 16 which may then be withdrawn from the shroud 81. A replacement shock absorber may then be inserted into the shroud 81 and a retaining nut having internally formed threads can then be installed on the newly formed threaded portion 94 of the shroud 81.

In accordance with the provisions of the patent statutes, the principle and mode or operation of the invention have been explained in which is considered to represent its best embodiment. It should, however, be understood that the invention may be practiced otherwise than as specifically illustrated and described without departing from its spirit or scope.

What is claimed is:

1. An apparatus for forming threads on an end wall of a hollow cylindrical shroud of a shock absorber assembly comprising:

guide means for insertion into the interior of the cylindrical shroud, said guide means including a collet having a first plurality of outwardly adjustable arms terminating at one end of said collet and having a second plurality of outwardly adjustable arms terminating at the opposite end of said collet, each of said first and second arms provided with an arcuate engaging surface generally conforming to the inner wall of the shroud, said guide means including means for moving said first and second arms outwardly whereby the arcuate engaging surfaces of said first and second arms are moved into engagement with the inner wall of the shroud to maintain said guide means in coaxial alignment with the interior of the shroud, said guide means further including an arbor means extending axially from one end of said collet, said arbor means having an externally threaded section of a predetermined pitch in coaxial alignment with the axis of said guide means;

driver means rotatably mounted on said guide means for longitudinal movement along the axis of said guide means, said driver means provided with an internally threaed section for threaded engagement with the externally threaded section of said arbor means;

thread forming means for forming threads having a pitch corresponding to the pitch of the threaded sections of the arbor means of said guide means and said drive means; and means for mounting said thread forming means on said driver means to permit limited radial movement of said thread forming means relative to the axis of said guide means whereby the axis of said thread forming means can vary relative to the axis of said guide means.

* * * * *